July 11, 1967 N. L. CULL ETAL 3,330,875
DECOBALTING HYDROXYLATED POLYMERS WITH CONCENTRATED
PHOSPHORIC ACID
Filed Dec. 19, 1963 2 Sheets-Sheet 1

Neville Leverne Cull
Joseph Kern Mertzweiller   INVENTORS

BY *C. B. Barris*

PATENT ATTORNEY

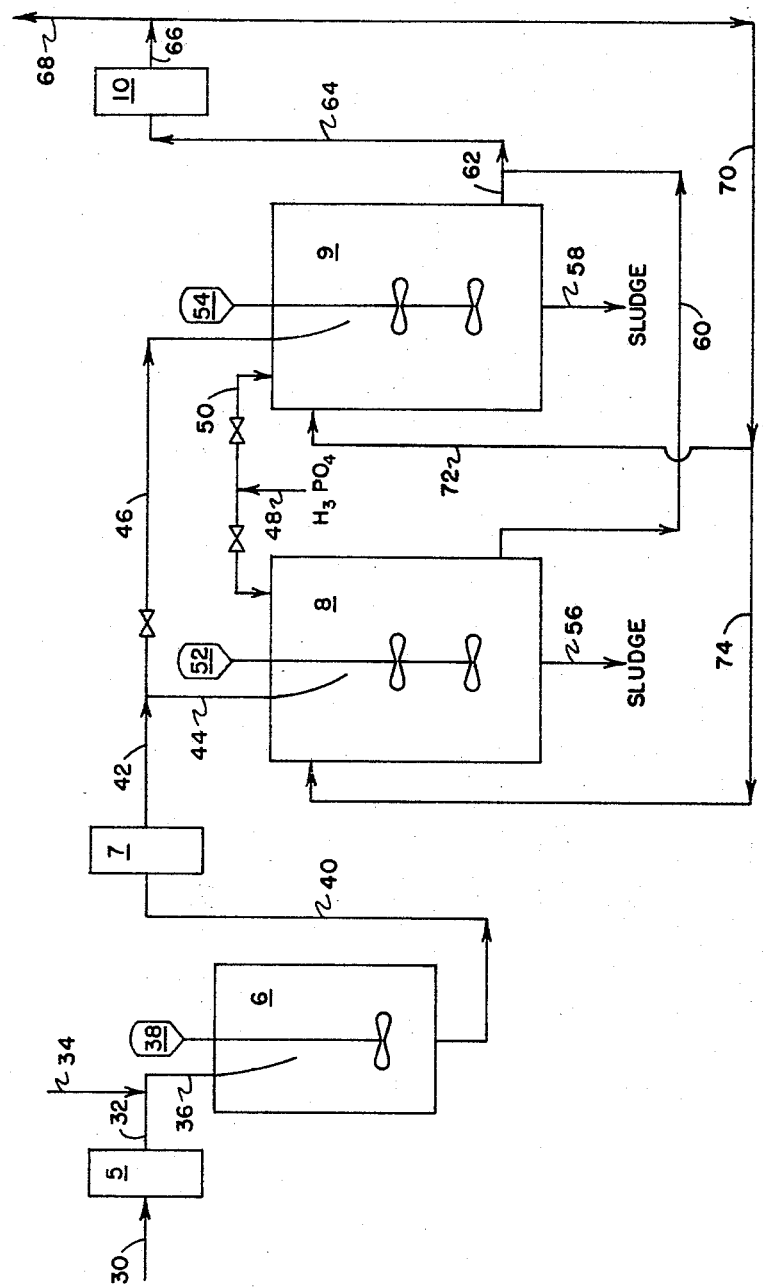

United States Patent Office 3,330,875
Patented July 11, 1967

3,330,875
DECOBALTING HYDROXYLATED POLYMERS WITH CONCENTRATED PHOSPHORIC ACID
Neville Leverne Cull, Baker, and Joseph Kern Mertzweiler, Baton Rouge, La., assignors to Esso Research and Engineering Company, a corporation of Delaware
Filed Dec. 19, 1963, Ser. No. 331,862
13 Claims. (Cl. 260—637)

The present invention relates to the preparation of hydroxylated polymers by the reaction of carbon monoxide and hydrogen with hydrocarbon polymers having at least one ethylenic carbon-to-carbon bond in said polymer in the presence of a hydroformylation catalyst. More particularly, the present invention relates to the decobalting of the hydroformylation catalyst utilized in the foregoing reaction from the product of the second stage of two stages employed in the production of said hydroxylated polymers.

It is now known that a substantially completely saturated hydroxylated polymer can be produced from polymers having at least one ethylenic carbon-to-carbon bond in said polymer by utilizing a two-stage process in which process conditions in the first stage are set to maximize oxonation and minimize hydrogenation of unsaturated carbon-carbon linkages, followed by a second stage operating under maximum hydrogenation conditions. Hence, in accordance with such process, the hydroxylated polymers are produced in a two-stage process which comprises reacting, in a first stage, an unsaturated hydrocarbon compound having a molecular weight of from 300 to about 1,000,000 with carbon monoxide and hydrogen in the presence of a hydrocarbon soluble complex having the formulae:

(1) $\qquad [M_2(CO)_6(BR_3)_2]$ and (2) $\qquad [(R')M(CO)_y(BR_3)]_x$ where in both Formula 1 and Formula 2 M is a transition metal selected from the group consisting of iron, cobalt, and rhodium, and preferably is cobalt; B is a Group V–A atom selected from the group consisting of phosphorus and arsenic, and preferably is phosphorus; R is an alkyl radical containing from 1 to about 20, and preferably 1 to 6 carbon atoms and in Formula 2 R' represents a pi-bonded conjugated diolefin or allylic structure containing 3 to 6 carbon atoms; $x$ is 1 or 2 and $y$ is 1 or 2, with the proviso that when $x$ is 1 then $y$ is 2, and when $x$ is 2, then $y$ is 1, to produce a carbonylated intermediate polymer and, in a second stage, reacting said intermediate polymer with hydrogen and from 10 to 200 p.s.i.g. partial pressure of CO in the presence of a catalyst as set forth above and recovering the resulting hydroxylated polymer.

In the process to which the present invention is directed, a very rapid hydrogenation is achieved which will hydrogenate not only the carbonyl group, but also the unsaturation in the polymer chain. Thus, by utilization of the described process, hydrogenation may be carried out to almost any degree ranging from a completely saturated hydroxylated polymer to a hydroxylated poylmer with appreciable amounts of residual unsaturation.

The above described process is generally applicable to the hydroformylation of any hydrocarbon polymer having at least one ethylenic carbon bond in said polymer. Thus, polymers having Type I (pendant vinyl) unsaturation, Type II (internal cis or trans) unsaturation, Type III (tertiary) unsaturation, Table IV (tri substituted) unsaturation or polymers having more than one of such types may be employed in this process. Certain types of unsaturation are found to be preferred over the others, however, and therefore Type I (pendant vinyl) and Type III (tertiary) unsaturation are most preferably present in the hydrocarbon polymer with Type II (internal cis or trans) and Type IV (tri substituted) unsaturation following in that order. The hydrocarbon polymers suitable for use in the process are further characterized by their molecular weight, viz about 300 to about 1,000,000 or more. The polymers amenable to the hydroformylation reaction of this invention may be oily, elastomeric, plastic, and the like type polymers prepared by any suitable polymerization process. Thus, included are the Buton resins, elastomeric polybutadienes, styrene-butadiene rubber, natural rubber, and ethylene-propylene-diolefin tripolymers. The basic requirement is that the polymers contain one or more of the types of unsaturation set forth above and in sufficient quantity that they undergo reaction with the type of catalysts described herein.

It has been found that diolefin polymers or copolymers of a diolefin with a mono-olefin are especially amenable to the described process. Therefore, polybutadiene, polypentadiene, polycyclopentadiene, polyisoprene, and mixtures, or copolymers of one or more of these diolefins and the like are examples of preferred polymers. Examples of the preferred copolymers of diolefins with mono-olefins contemplated are butadiene-styrene copolymers, pentadiene-styrene copolymers, isoprene-styrene copolymers, and also copolymers of the diolefins with aliphatic mono-olefins, methyl styrene, and the like.

Especially amenable as starting polymers are commercial polybutadienes or copolymers of butadiene and styrene of molecular weight in the range of about 300 to about 4,000, for example, Buton-100 of molecular weight 2500–4000 and Buton-150 of molecular weight 1500–2000.

The hydrocarbon polymers employed may generally be prepared by any method known to the art, for example, by the use of a sodium or lithium alkyl or free radical catalyst.

The polymers are generally employed in an inert hydrocarbon medium which may be either paraffinic or aromatic-type solvents, the latter being preferred. The polymer may also be employed without a diluent.

As hereinbefore mentioned, in general, the hydrocarbon soluble complexes used as catalysts in both stages of the process are oxo-type catalysts and can be broadly represented by the following formulae:

(1) $\qquad [M_2(CO)_6(BR_3)_2]$ and (2) $\qquad [(R'')M(CO)_y(BR_3)]_x$ where in both Formula 1 and Formula 2 M is a transition metal selected from the group consisting of iron, cobalt, and rhodium, and preferably is cobalt; B is a Group V–A atom selected from the group consisting of phosphorus and arsenic, and preferably is phophorus; R is an alkyl radical containing from 1 to about 20, and preferably 1 to 6 carbon atoms and in Formula 2 R'' represents a pi-bonded conjugated diolefin or allylic structure containing 3 to 6 carbon atoms; $x$ is 1 or 2 and $y$ is 1 or 2 with the proviso that when $x$ is 1 than $y$ is 2, and when $x$ is 2, then $y$ is 1.

The preferred forms of the complexes employed in both stages of the process, however, are represented by Formulae 3 and 4, which are as follows:

(3) $\qquad [Co_2(CO)_6(PR_3)_2]$ and (4) $\qquad [(C_nH_{2n-1})Co(CO)_y(PR_3)]_x$ where in both Formula 3 and Formula 4, R is an alkyl radical containing from 1 to 6 carbon atoms, and in Formula 4, $n$ is an integer from 3 to 6, and $x$ and $y$ are as defined above.

With regard to the complexes employed in both stages of the process, it should be noted that some of the catalytic species may be isolated in a stable crystalline form which has unique and unusual properties. Further, all of these active catalyst species are extremely soluble in both hydrocarbon and polar solvents and in the latter solvents exhibit the conductivity of a typical weak electrolyte. However, the infrared spectrum of each of the catalysts is the same in all solvents in which it has been measured, thereby indicating no reaction with the solvent.

Preparation of the complexes employed in both stages of the process is described more fully in copending applications, Ser. No. 256,258 and Ser. No. 256,260 of Mertzweiller and Tenney, both filed Feb. 5, 1963, the latter now abandoned. It should be understood, however, that the scope of the instant application should be in no way restricted in view of the above disclosures.

In broad terms, the first stage hydroformylation reaction step of the process to which the present invention is concerned is effected by intimately contacting an olefinic hydrocarbon polymer with carbon monoxide and hydrogen in the presence of the phosphine catalyst complex hereinbefore described at hydroformylation temperature and pressure. In this first stage, conditions are set to maximize carbonylation and minimize hydrogenation.

The first stage reaction may be performed at pressures of from 300 to 2000 p.s.i.g., and preferably at pressures of from 500 to 1200 p.s.i.g.

The first stage reaction temperatures employed are in the range of from 275 to 425° F., and are preferably in the range of from 300 to 400° F.

The reaction time in the first stage is from 30 minutes to 5 hours and preferably is from 1 to 3 hours.

The molar ratio of hydrogen to carbon monoxide is not especially critical and may be varied to some extent. Suitably, the ratio employed will be about 1:1. It has been found, however, that by increasing the $H_2/CO$ ratio to about 3:1, the rate of reaction, as well as the yield of carbonylated product may be increased. While ratios higher than the foregoing, for example, 10:1 or higher, may be employed, there is no advantage in using said higher ratios.

The use of low catalyst concentrations, that is, 0.05 to 0.5 wt. percent as metal based on the weight of the polymer, is preferred in the process of the present invention. The most suitable range includes catalyst concentrations as low as 0.1 to 0.40 wt. percent as metal based on the weight of the polymer.

Use of the first stage reaction temperature set forth above, e.g., 300–400° F., using 1/1 ratio of $H_2/CO$ gas as 500–1200 p.s.i.g. total pressure results in a predominance of aldehydic products. At these conditions, the hydroformylation is quite selective, there is little competing hydrogenation, and the residual unsaturation depends primarily upon the amount of functionality introduced.

The second stage hydrogenation reaction may be performed at pressures of from 100 to 3000 p.s.i.g., and preferably at pressures of from 1000 to 1500 p.s.i.g.

The second stage reaction temperatures employed are in the range of from 325 to 450° F., and are preferably in the range of from 375 to 425° F.

The reaction time in the second stage is from 0.5 to 6 hours, and preferably is from 1 to 2 hours.

Hydrogenation of the intermediate aldehydic product of stage 1 is preferably effected with the same catalyst used in the first stage although additional catalyst may be added, if desired.

In the second stage, an extremely rapid hydrogenation is achieved which will hydrogenate not only the carbonyl group, but also internal unsaturation in the polymer chain. This is believed to proceed with a homogeneous catalyst system which activates hydrogen, the primary component of which being the complexes as hereinbefore described, and very probably previously undisclosed metal hydrocarbonyls containing phosphorus ligands, e.g., $$H[Co(CO)_3PR_3] \text{ and } H[(C_nH_{2n-1})Co(CO)PR_3]$$

which are now found to be unusually stable and active hydrogenation catalysts. It is, therefore, preferable to avoid conversion of the complexes to metallic forms of cobalt, even in colloidal forms. This object is accomplished by retaining sufficient CO partial pressure, for example, about 10 to 500 p.s.i.g., and preferably about 30 to 90 p.s.i.g., to stabilize the system.

The prevention of formation of metallic forms, especially the colloidal form, from the catalyst complexes is noteworthy inasmuch as such formation is not only deleterious to the effectiveness of the hydrogenation reaction per se, but such colloidal form also makes removal of the catalyst metal most difficult, if not impossible. This difficulty of removal adds to the problem, the solution of which the present invention is directed. Thus, proper hydrogenation procedure is imperative to insure the success of the present invention.

Preparation of the hydroxylated polymers which are subjected to treatment in accordance with the present invention is described more fully in copending application Ser. No. 307,359 of Cull, Mertzweiller, and Tenney filed Sept. 9, 1963. It should again be understood that the scope of the instant application should be in no way restricted in view of the above disclosure.

At the end of the second stage, when the desired conversion of the olefinic polymers to saturated-hydroxylated polymers has been effected, the reaction product and the unreacted material are generally withdrawn to a catalyst removal zone, where dissolved catalyst is removed and it is to this stage that the present principal invention applies.

One proposed method of catalyst complex removal is by heating the reaction product in a vessel which may be packed with catalytically inert material and which may be under elevated pressures in the presence of an inert vapor, such as hydrogen to maintain CO partial pressures as low as possible. The metal carbonyl present in the catalyst complex is thereby decomposed and is precipitated into the product stream from which it may be removed, and precipitated onto the walls and other surfaces within the tower. Such process, however, requires periodic interruption in order to remove accumulated metallic deposits of the catalyst metal in order to prevent plugging up feed inlet lines and adjacent areas of said demetallizing vessel. Furthermore, metal deposits as a film on the heating means and requires constant removal to prevent the plugging up of preheating equipment and surfaces. The removal of these films and deposited metal is a tedious and difficult process and adds significant costs to the economics of the hydroformylation reaction.

An additional drawback associated with the above demetallization process is the fact that relatively high temperatures are required, e.g. as high as 450° F. and for protracted treating periods. While the hydroxylated polymers produced by the two-stage process as hereinbefore described exhibit remarkable stability, subjection to high temperatures for long time periods can actuate secondary reactions, such as cracking and/or condensations, which are naturally undesirable in the process.

Another method of demetallization which has been found to be attractive is that described in copending application Ser. No. 331,863 of Cull and Mertzweiller, filed Dec. 19, 1963. According to such method, certain aqueous acids; namely, phosphoric, formic, and citric acids employed under relatively mild conditions, have been found to have the exceptional properties of combining and reacting with the phosphite type hydroformylation catalyst complexes dissolved in polymer reaction products which have had their unsaturation carbonylated and subsequently precipitating said complexes out of solution, substantially in the absence of undesirable emulsions. By means of adding a solution of the acid in aqueous solvent, along with a degree of agitation, intimate contact between said acid and the carbonylated polymer is obtained, partly because of the homogeneous condition of the solution. The catalyst complex subsequently precipitates, and a carbonylated polymer product, requiring only a filtration treatment to be substantially free of catalyst complex, is obtained.

While the foregoing method is especially attractive for the removal of catalyst complex from carbonylated polymers, such method is found to be sufficiently ineffective with regard to the hydroxylated polymers so as to be considered essentially inoperable. For example, it has been found, and supporting data are herein later presented, that treatment with an aqueous solution of an acid, e.g. $H_3PO_4$ acid, as taught in the above-mentioned copending application, is substantially ineffective for demetallizing hydroxylated polymers, mainly because of the emulsions formed.

It is therefore the principal object of the present invention to provide an effective and novel means of removing dissolved hydroformylation catalyst from hydroxylated polymer products resulting from reaction of hydrocarbon polymers having at least one ethylenic carbon-to-carbon bond with CO and $H_2$.

Another object of the present invention is to effect substantially complete removal of dissolved hydroformylation catalyst from hydroxylated polymer products without encountering the processing difficulties heretofore encountered and without causing formation of undesirable secondary reaction products.

Other objects and advantages of the invention will become apparent from the description hereinafter.

It has now been found that non-aqueous phosphoric acid, i.e. $H_3PO_4$, either added in concentrated form or dissolved in a low molecular weight oxygenated organic solvent has exceptional properties of combining and reacting with the hydroformylation catalyst complexes dissolved in the hydroxylated polymer reaction products and precipitating them out of solution, substantially in the absence of undesirable emulsions. By means of adding the concentrated acid (i.e., 86% acid by weight) or the solution of the acid in non-aqueous solvent, along with a degree of agitation, intimate contact between said acid and the hydroxylated polymer is obtained, partly because of the homogeneous condition of the solution. Within a short time catalyst complex begins to precipitate, and a hydroxylated polymer product, requiring only a filtration treatment to be substantially free of catalyst complex, is obtained.

As used herein, the term "non-aqueous phosphoric acid" defines either the concentrated form of the $H_3PO_4$ acid, i.e., 86% acid by weight in the absence of extraneous water, or such acid dissolved in a non-aqueous oxygenated organic solvent as hereinlater set forth.

The present invention and its application will best be understood from the more detailed description hereinafter, wherein reference will be made to the accompanying drawings in which:

FIGURE 2 is a schematic illustration of a system suitable for carrying out a preferred embodiment of the invention.

Figure 1:
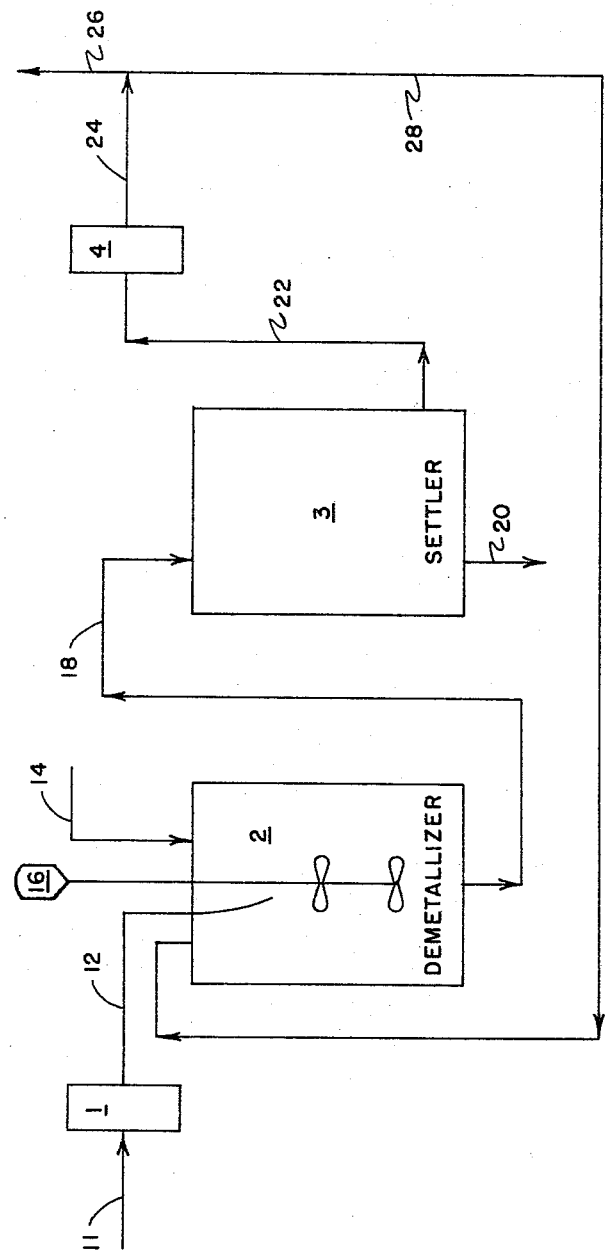
FIGURE 1 is a schematic illustration of a system suitable for carrying out an embodiment of the invention.

Referring to FIGURE 1 of the drawings, a stream of hydroxylated polymer reaction product, produced in two reaction vessels (not shown) in a manner as hereinbefore described and containing dissolved therein relatively high concentrations of cobalt hydrofromylation catalyst complex is passed through line 11 to filter 1 for removal of coarse solid particles which may be entrained in the reaction product stream. The filtered product stream is then passed via line 12 into catalyst removal or demetallizing zone 2.

In the embodiment of the invention shown in FIGURE 1, wherein the phosphoric acid is added as a solution in a non-aqueous solvent medium, it is desirable to add a molar excess, based on metal content, for example, a 10% excess, of phosphoric acid to the hydroxylated polymer product. Thus, a solution of phosphoric acid in a low molecular weight oxygenated organic solvent may be passed into demetallizer 2 through line 14. Analysis of the cobalt in the hydroxylated polymer product determines the amount of acid to be added. Generally from 0.025 to 1.0 weight percent of the acid based on the product stream is found to be adequate with 0.05 to 0.2 weight percent being preferred. Suitable solvents include $C_1$–$C_4$ alkanols, e.g. methanol, isopropanol and butyl alcohol as well as acetone, dimethyl sulfoxide and the like. Suitably, the oxygenated organic solvent contains, dissolved therein, 5 to 40 percent by weight of the phosphoric acid and preferably 10 to 20 percent by weight. The temperature with demetallizer 2 is maintained in the range of about 125 to 300° F., preferably about 200 to 250° F. Higher temperatures are not required nor desired. The pressure within demetallizer 2 is maintained at from 100 to 500 p.s.i.g. of nitrogen pressure or other inert gas and preferably under 200 to 400 nitrogen pressure. Precipitation proceeds rapidly and a holdup or contact time period of 10 minutes to 2 hours and preferably 30 minutes to 1 hour is found to be suitable. It has further been found that it is advantageous to provide suitable agitation means in demetallizer 2 shown herein at 16.

The mixture of hydroxylated polymer, solvent, and precipitated cobalt catalyst complex is then passed through line 18 to settler 3. The settler is maintained at temperatures of from 80 to 200° F., preferably 80 to 120° F. The mixture is retained in the settler for a period of 1 to 72 hours, preferably 8 to 24 hours wherein the precipitate separates from the hydroxylated solvent layer and sinks to the bottom of settler 3, from which it may be withdrawn through line 20 and disposed of in a suitable manner.

Because of the relatively small amount of hydroformylation catalyst employed in the preceding two-stage oxonation-hydrogenation reaction, it is found to be inexpedient to reuse or recycle said catalyst back into the system.

The substantially clear supernatant hydroxylated polymer-solvent, e.g., benzene, mixture is then advantageously passed from settler 3 through line 22 to filter 4 for removal of any remaining suspended cobalt hydroformylation catalyst particles. If desired, the treated polymer product may, prior to final filtration, be percolated through solid oxalic acid or activated alumina, or preferably, 4A or 5A sieves. This percolation step is then followed by the final filtration through filter 4 or, optionally, a centrifuge operation or azeotropic distillation. The resulting demetallized product may then, if desired, be sent to product storage or further treatment via lines 24 and 26.

The process of the invention admits of numerous modifications apparent to those skilled in the art. Thus, under certain conditions, it may be advantageous to recycle at least a portion of the demetallized product stream back to demetallization zone for further treatment. Hence, assuming conditions such that unusually high metal catalyst values are contained in the hydroxylated polymer stream (initially introduced through line 2) it is then advantageous to separate a portion of, or alternatively, remove all of the stream from filter 4 and recycle same to demetallizer 2, via lines 24 and 28.

Also, if desired, the cobalt-free product may be passed to a flash still (not shown) through line 26 wherein low boiling solvents added in demetallizer 2 are removed from the final hydroxylated polymer product and concentration to the desired solids content can be effected.

FIGURE 2 illustrates a preferred embodiment of the present invention. In such embodiment a stream of hydroxylated polymer reaction product, produced as described above, and containing relatively high concentrations of dissolved hydroformylation catalyst, is passed through line 30 to filter 5 for removal of coarse solid particles which may be entrained in the reaction product stream. The filtered product is then passed via line 32 into the catalyst removal or demetallization zone.

In the preferred embodiment of the invention illustrated in FIGURE 2, a phosphoric acid treat is effected, preceded by a water treatment. Thus, in accordance with this embodiment, from 0.5 to 5.0 percent by weight and preferably 0.5 to 1.0 percent by weight of water, based on the product stream, is added to said product stream via line 34. The resulting mixture of water and hydroxylated polymer stream is then passed to water treatment or demetallization zone 6 via line 36. The temperature is found to be somewhat critical and is thus maintained within the zone from 350 to 425° F. and preferably is 375 to 390° F. The pressure within zone 6 is maintained at from 200 to 500 p.s.i.g. of nitrogen pressure or other inert gas and preferably under 300 to 400 lbs. nitrogen pressure. It is also advantageous to provide suitable agitation means, shown herein at 38. It is found that under such conditions a holdup or residence time period of from 15 minutes to 2 hours is suitable with from 30 to 60 minutes being preferred. After the foregoing water treatment in zone 6, the resulting treated product stream may be passed through filter 7, via line 40 and thence to a second stage of the demetallizing zone via line 42.

In the embodiment illustrated in FIGURE 2 of the drawings, this second stage of the demetallization zone is represented by a series of two demetallization and settling vessels, viz vessels 8 and 9. Said zone may suitably comprise but one vessel, or may, if desired, be comprised of a series of three or more vessels. As illustrated, however, the treated product stream may be introduced to each of said vessels 8 and 9 through lines 44 and 46 respectively. Into each of said vessels 8 and 9, a molar excess preferably about 10 percent excess, based on metal concentration of phosphoric acid is added via lines 48 and 50 respectively. The phosphoric acid is preferably added in concentrated form, that is, 86 percent by weight of acid, or may be added as a solution of phosphoric acid in a low molecular weight oxygenated organic solvent and in the amounts set forth above or in aqueous solution. In accordance with this embodiment, vessels 8 and 9 are suitably agitated by means 52 and 54 and are maintained at temperatures of from 80 to 250° F., preferably of from 80 to 100° F. The mixture is maintained in vessels 8 and 9 for a period of from about 4 to 72 hours and preferably about 8 to 24 hours. At least a portion of the sludge which is precipitated during such residence period settles to the bottoms of vessels 8 and 9 and may be withdrawn through lines 56 and 58. The resulting substantially clear, supernatant-hydroxylated polymer and any solvent it may contain is then removed from vessels 8 and 9 by means of lines 60 and 62 respectively and is passed through filter 10 via line 64, for removal of any remaining suspended cobalt hydroformylation catalyst particles. The resulting demetallized product may then, if desired, be sent to product storage or further treatment via lines 66 and 68. In this embodiment also at least a portion of or all of the stream from filter 10 may be recycled to the demetallization zone. Thus, such portion of the product stream form filter 10 may be recycled to vessels 8 and 9 via lines 66, 70, 72, and 74.

As in the foregoing embodiment also lends itself to many modifications. Hence, if desired, the treated product may, prior to fiinal filtration, be percolated over solid oxalic acid or activated alumina. This percolation step is then followed by the final filtration or optionally a centrifuging operation.

The process and advantages of the present invention may be further illustrated by the following specific examples.

Example I

The following example is illustrative of the preparation of the starting polymer to which the demetallization process of the present invention is directed.

Seven hundred grams of Buton-150 (polybutadiene molecular weight of 2000) in benzene (40% NVM) were hydroformylated using the tributyl phosphine modified cobalt octacarbonyl (0.09% cobalt on feed) under the following conditions.

| Process Conditions | Oxo Stage | Hydrogenation Stage |
|---|---|---|
| Temp., ° F | 350–360 | 390–400. |
| Press., p.s.i.g | 1,000–1,100 | 1,400–1,500. |
| Gas | Syn. Gas | Hydrogen. |
| ΔP, P.s.i.g | 1,100 | 1,900. |

At the conclusion of the hydrogenation step, 0.75 wt. percent of water was added and the product stirred for 20 minutes at 395° F.

The resulting hydroxylated polymer product gave the following analyses.

Oxygen _____wt. percent__ 4.6
NVM _____ 40.5
Cobalt _____p.p.m. (polymer basic)__ 416

Example II

The following example serves to illustrate a preferred treatment of the present invention, this is, the water pretreatment from Example I above, followed by phosphoric acid treatment. In Sample 1, 0.1 wt. percent of concentrated phosphoric acid was introduced with agitation followed by filtration. In Sample 2, 1.0 weight percent of a 10 weight percent solution of phosphoric acid in methanol solution was added. In summary, three 100-gram samples of product obtained from the two-stage hydroformylation process of Example I were treated as follows:

| Sample | Treatment | P.p.m. Cobalt |
|---|---|---|
| 1 | 0.1% H₃PO₄ 16 Hrs. at 80° F. (86%) Filtered. | 5 |
| 2 | 0.1% H₃PO₄ 16 Hrs. at 80° F. (1% of a 10% H₃PO₄—H₂O) Filtered. | 25 |
| 3 | 0.1% H₃PO₄ 16 Hrs. at 80° F. (1% of a 10% H₃PO₄—CH₃OH) Filtered. | 0.0 |
| 4 | None (Control) | 416 |

As can be seen from the above data, a two-stage water-acid treatment gave excellent decobalting of the hydroxylated polymer product.

Example III

The following example is presented in order to exhibit the necessity of the water pretreatment step. The treatment conditions herein were the same as in Example II. However, in order to show the advantages accruing from the process of this invention, hydroxylated polymer product from Example I, but without the water treating step (NVM 39.4, O₂=3.9 wt. percent, cobalt wt. percent 0.064) was treated as shown below.

| Sample | Treatment | Cobalt, p.p.m. (Polymer Basis) |
|---|---|---|
| 1 | 1% of 10% H₃PO₄, H₂O 16 Hrs. at 80° F. Filtered. | 940 |
| 2 | 0.1% (86% H₃PO₄) 16 Hrs. at 80° F. Filtered. | 970 |
| 3 | None | 950 |

No reduction in cobalt was noted in this case where the water treating step of Example I was omitted.

Example IV

Hydroxylated polybutadiene in benzene diluent
(NVM=41.4, O₂ wt. percent=7.5
and cobalt p.p.m. (polymer basis) 1120)

was treated for 0.5 hour with 1.0 wt. percent water at 375–385° F. and the resultant product filtered. Treatment was done in an autoclave using about 200–300 lbs. of nitrogen pressure. The cobalt on filtered product (polymer basis) was 350 p.p.m. or a reduction of approximately 69%.

The filtered product from the first stage, above, was treated with phosphoric acid as shown below:

| Sample | Wt. Percent on Solution | | Time (Hrs.) | Temp., °F. | Over-all Percent Cobalt Removal |
|---|---|---|---|---|---|
| | Phosphoric Acid | Methanol | | | |
| 1 | 0.1 | 0.0 | 72 | 80 | 93 |
| 2 | 0.1 | 0.9 | 72 | 80 | 93 |
| 3 | 0.2 | 0.8 | 72 | 80 | 94 |
| 4 | 0.2 | 1.8 | 72 | 80 | 94 |

Above data show that there is little or no incentive for increasing the phosphoric acid concentration above about 0.1 wt. percent.

*Example V*

Hydroxylated polybutadiene in benzene diluent (NVM=39.7, $O_2$ wt. percent 6.6 (polymer basis) and cobalt p.p.m.=1080 (polymer basis)) was heat treated for 20 minutes in a stirred autoclave under 300 lbs. nitrogen pressure with 1.0 wt. percent water. The product was filtered and the cobalt level on the filtered product was found to be 380 p.p.m. (65% reduction). The product was then treated as shown below.

| Sample | Wt. Percent on Solution | | Time (Hrs.) | Temp., °F. | Over-all Cobalt Removal |
|---|---|---|---|---|---|
| | $H_3PO_4$ Acid | Solvent | | | |
| 1 | 0.1 | 0.9 Water | 24 | 80 | 93 |
| 2 | 0.1 | 0.9 $CH_3OH$ | 24 | 80 | 93 |
| 3 | 0.1 | 0.9 Acetone | 24 | 80 | 93 |
| 4 | 0.1 | 0.9 Dimethyl Sulfoxide | 24 | 80 | 89 |
| 5 | 0.1 | 0.9 Butyl Alc | 24 | 80 | 92 |
| 6 | 0.1 | 0.9 Isopropanol | 24 | 80 | 92 |

Above data show some of the low molecular weight oxygenated organic solvents which are operable within the scope of this invention. Although aqueous phosphoric acid decobalts well, emulsion problems which make filtering difficult make this method undesirable.

*Example VI*

The effect of temperature upon the efficiency of the water treatment is illustrated below. The post treatment consisted of shaking filtered product with 0.1 percent phosphoric acid, letting settle for 16–24 hours, and refiltering.

*Example VII*

The following example illustrates the superiority of phosphoric acid over acetic acid. Hydroxylated polybutadiene in benzene solvent (NVM=40.5, $O_2$=7.1 wt. percent (polymer basis) cobalt=80 p.p.m. (polymer basis)) was treated with (1) aqueous phosphoric acid, and (2) aqueous acetic acid. While the problem of emulsion formation was encountered, the example is presented nothwithstanding this fact. Thus, data are given below which show the superiority of the phosphoric acid, even when employed in the aqeous form.

COMPARISON OF ACETIC AND PHOSPHORIC ACID

| Sampl | Wt. Percent on Solution | | Conditions | Percent Cobalt Removed |
|---|---|---|---|---|
| | Acid | Water | | |
| 1 | 0.1 Phosphoric | 0.9 | 1 Hr. at 250° F | 85 |
| 2 | 0.1 Acetic | 0.9 | 1 Hr. at 250° F | 23 |

Further comment need not be made in view of the vast superiority of the phosphoric acid over the acetic acid treatment.

*Example VIII*

Hydroxylated polybutadiene (NVM=39.7, diluent toluene, $O_2$=7.0 wt. percent (polymer basis) cobalt=710 p.p.m. (polymer basis)) was treated with 1% of 10% phosphoric acid in methanol for 30 minutes at 250° F. The filtered product was then treated similarly with 0.5% of 10% phosphoric acid in methanol. The resulting data are summarized below:

| Sample | Wt. Percent on Solution | | Percent Cobalt Removal |
|---|---|---|---|
| | Acid | Methanol | |
| 1 | 0.1 | 0.9 | 83 |
| 2 | 0.05 | 0.45 | [1] 87 |

[1] Over-all.

| Sample | Polymer | Treatment | Percent Coblt[1] Reduction | Percent Over-all CO Reduction[2] |
|---|---|---|---|---|
| 1 | Hydroxylated Polybutadiene | 1% $H_2O_2$ 16 Hrs. at 80° F | 0 | 0 |
| 2 | do | 1% $H_2O_2$ 1 Hr. at 250° F | 46 | 75 |
| 3 | do | 1% $H_2O_2$ 0.5 Hr. at 375° F | 69 | 93 |

[1] Cobalt reduction effected by water treat only.
[2] After post treatment with phosphoric acid.

Example IX

Hydroxylated polybutadiene in toluene (NVM 40.3, $O_2$=wt. percent on polymer, cobalt=1360 p.p.m. (polymer basis)) was treated as in Example VIII except that 10% phosphoric acid in acetone was used.

| Sample | Wt. Percent on Solution | | Percent Cobalt Removal |
|---|---|---|---|
| | Acid | Acetone | |
| 1 | 0.1 | 0.9 | 85 |
| 2 | 0.05 | 0.45 | [1] 92 |

[1] Over-all.

Example X

Carbonylated polybutadiene in benzene (NVM=39.4, oxygen=3.6 wt. percent on polymer, cobalt=1450 p.p.m. (polymer basis)) was treated with 1% of a 10% solution of phosphoric acid in acetone for 1 hr. at 250° F. The filtered product had a cobalt content of 1400 p.p.m. for about 3% removal.

The above examples (VIII, IX, and X) show that alcoholic or acetone solutions of $H_3PO_4$ will deash hydroxylated polymer, but will not deash a carbonylated polymer product.

Example XI

Hydroxylated polybutadiene in benzene diluent, NVM=39.7, $O_2$=6.6 wt. percent on polymer and cobalt=1080 p.p.m. (polymer basis) was treated with aqueous phosphoric acid. Data are tabulated below:

| Sample | Wt. Percent on Solution | | Time (Hrs.) | Temp., °F. | Percent Cobalt Removed |
|---|---|---|---|---|---|
| | Water | Acid | | | |
| 1 | 0.9 | 0.1 | 1 | 250 | 80 |
| 2 | 1.8 | 0.2 | 1 | 250 | 77 |
| 3 | 2.9 | 0.1 | 1 | 250 | 83 |

Although aqeuous decobalting with phosphoric acid gives comparable levels of cobalt reduction, the emulsions which resulted were extremely difficult to break. For this reason, phosphoric acid in methanol or acetone is preferred, or the use of water alone (1% or less) at high temperatures followed by a post treatment with concentrated phosphoric acid or non-aqueous solutions thereof.

Note also that aqueous phosphoric acid (0.1% $H_3PO_4$, 0.9% water) at 375–380° F. leads to cross-linking and considerable gel formation so that this route is not practical.

Resort may be had to various modifications and variations of the present invention without departing from the spirit of the discovery or the scope of the appended claims.

What is claimed is:

1. In the process wherein hydrocarbon polymers having at least one ethylenic carbon-to-carbon bond in said polymer, carbon monoxide and hydrogen are contacted in a two-stage oxonation-hydrogenation zone at elevated temperatures and pressures with a cobalt hydroformylation catalyst under conditions to produce substantially saturated-hydroxylated polymers, and wherein said hydroxylated polymers containing dissolved therein cobalt compounds are further treated to remove said cobalt compounds in a catalyst removal zone, the improvement which comprises treating said hydroxylated polymer product containing said cobalt compounds in solution with a molar excess of concentrated phosphoric acid in said catalyst removal zone to precipitate cobalt-comprising compounds, removing said cobalt-comprising compounds from said catalyst removal zone and recovering a substantially decobalted hydroxylated polymer.

2. The process of claim 1 wherein said phosphoric acid is added to said catalyst removal zone as a solution in a low molecular weight oxygenated organic solvent selected from the group consisting of $C_1$–$C_4$ alkanols, acetone, and dimethylsulfoxide.

3. The process of claim 2 wherein the oxygenated organic solvent is methanol.

4. The process of claim 2 wherein the oxygenated organic solvent is isopropanol.

5. The process of claim 2 wherein the oxygenated organic solvent is butyl alcohol.

6. The process of claim 2 wherein the oxygenated organic solvent is acetone.

7. The process of claim 2 wherein the oxygenated organic solvent is dimethyl sulfoxide.

8. The process of claim 1 wherein the phosphoric acid is added in amounts of from 0.05 to 5.0 percent by weight based on the weight of said hydroxylated polymer.

9. An improved process for removing cobalt from a hydroxylated polymer product obtained by reacting a hydrocarbon polymer having at least one ethylenic carbon-to-carbon bond with CO and $H_2$ in the presence of a cobalt hydroformylation catalyst in a two-stage process in which process conditions in the first stage are set to maximize oxonation and minimize hydrogenation of unsaturated carbon-to-carbon linkages, followed by a second stage operating under maximum hydrogenation conditions which comprises passing said hydroxylated polymer products to a water treating zone, contacting said polymer with from 0.05 to 5.0 weight percent of water based on the weight of the polymer, passing said water treated polymer product to a decobalting zone, contacting said polymer with a molar excess of concentrated phosphoric acid (86% by weight), forming a precipitate of cobalt comprising compounds in said decobalting zone, allowing said precipitate to settle, removing said settled precipitate from said zone and recovering a substantially decobalted hydroxylated polymer.

10. The process of claim 9 wherein the water treatment zone is maintained at a temperature between 350 and 425° F. and at a pressure of from 300 to 500 p.s.i.g. of nitrogen pressure.

11. The process of claim 9 wherein the decobalting zone is maintained at a temperature between 80 and 250° F.

12. The process of claim 9 wherein the phosphoric acid is added as a solution in a low molecular weight oxygenated organic solvent selected from the group consisting of $C_1$–$C_4$ alkanols, acetone, and dimethyl sulfoxide.

13. The process of claim 9 wherein at least a portion of said cobalt hydroformylation catalyst in said two-stage process is tributyl phosphine.

References Cited

UNITED STATES PATENTS 3,232,848  2/1966  Johnson.
3,234,146  2/1966  Null et al.

LEON ZITVER, *Primary Examiner.*

J. E. EVANS, *Assistant Examiner.*